March 25, 1947. T. A. ST. CLAIR ET AL 2,417,955
LOCKABLE PIPE CONNECTION
Filed Aug. 14, 1945
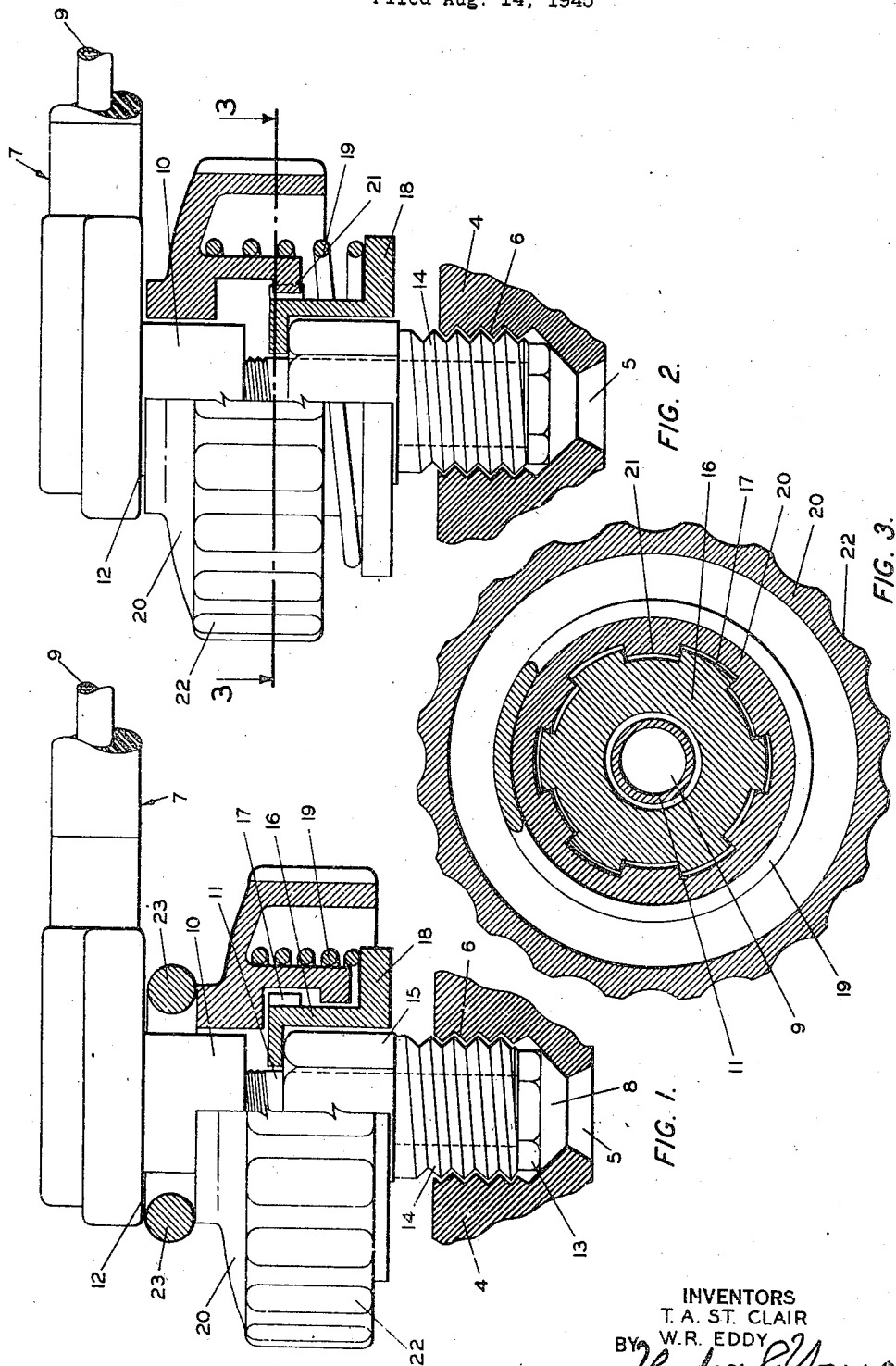
INVENTORS
T. A. ST. CLAIR
W. R. EDDY
BY Hudson & Young
ATTORNEYS Patented Mar. 25, 1947

2,417,955

UNITED STATES PATENT OFFICE 2,417,955

LOCKABLE PIPE CONNECTION

Theodore A. St. Clair and William R. Eddy, Bartlesville, Okla., assignors to Phillips Petroleum Company, a corporation of Delaware Application August 14, 1945, Serial No. 610,740

4 Claims. (Cl. 285—1)

This invention relates to lockable pipe connections. In a more specific aspect it relates to means for locking a pipe in connected position to a fluid containing cylinder, such as a cylinder containing liquefied petroleum gas.

In many parts of the country beyond the city gas mains, people have gas stoves connected to bottles of gas. The gas is generally liquefied petroleum gas such as propane, butane or mixtures of the two. The gas bottles or other metal tanks or containers for the gas are generally located outside the house adjacent to the kitchen.

Some difficulty has been occasioned by unauthorized persons tampering with these gas containers unknown to the occupants of the house, especially during periods when the house is vacant. Such unauthorized disconnection of the containers may result in loss of valuable fuel gas, theft of the containers and perhaps some fire hazard.

The principal object of this invention is to prevent such unauthorized disconnection of pipes from such containers.

Another object is to provide a simple and foolproof means for locating pipe connections so that pipes cannot be disconnected.

Another object is to provide means for locking two screw threaded elements in connection with each other which means is adapted to comprise in part an ordinary padlock.

Numerous other objects and advantages will be apparent to those skilled in the art upon reading the accompanying specification, claims and drawings.

In the drawings:

Figure 1 is an elevational view with parts broken away and in cross section of a lockable pipe connection embodying the present invention, the connection being shown in locked position.

Figure 2 is a similar view of the same structure shown in Figure 1 except that the padlock has been removed and the lockable pipe connection is unlocked.

Figure 3 is a cross sectional view of the structure shown in Figure 2 taken along the lines 3—3 of Figure 2 looking in the direction indicated by the arrows.

In Figure 1 a body 4 is provided with an opening 5 a portion of which opening is screw threaded at 6 for connection with a pipe generally designated as 7. Body 4 may be any type of body but in the specific application of the invention to liquefied petroleum gas systems, body 4 is a tank or fluid containing cylinder which may be secured or locked in non-rotatable position to an immovable object such as a house (not shown). Pipe 7 may be any pipe but in the specific application of the invention to liquefied petroleum gas systems, pipe 7 is relatively short and while flexible is substantially immovable as it is secured to apparatus similarly secured to an immovable object such as the above mentioned house (not shown).

Pipe 7 has an end 8 adapted to be disposed in communication with said opening 5. For purposes of illustration it has not been thought necessary to show the internal conduit 9 of pipe 7 but obviously conduit 9 extends all the way through pipe 7 down to end 8 so that fluid may pass from inside container 4 through opening 5 and through the conduit 9 in pipe 8 to the place where the fluid is to be used.

Pipe 8 has a reduced intermediate portion 10 which is of reduced area and such reduced portion may be of several different diameters such as 10 or 11 or may be of a single diameter, such obvious changes in form or design not departing from the present invention because the functions of parts would be unchanged.

Because of the intermediate portion pipe 7 has an upper shoulder 12 and a lower shoulder 13. A screw threaded sleeve 14 is mounted for rotation on said portion of reduced area 10 or 11, said screw threaded sleeve 14 being adapted to screw into said screw threaded opening 6. Said screw threaded sleeve 14 has a non-circular portion 15. A sleeve 16 is disposed around the non-circular portion 15 in driving connection therewith, the simplest means being to have the interior of 16 correspond to the exterior of 15. Sleeve 16 has an exteriorly splined portion 17 which is of limited longitudinal extent. A sleeve 16 may also be supplied with a ledge 18 to support spring 19. However, spring 19 could instead be supported on body 4 if so desired.

Spring 19 is an ordinary helical compression spring but obviously any other type of spring means such as a rubber block or sleeve could be employed in place of spring 19.

A sleeve 20 having an internally splined portion 21 is mounted for longitudinal movement relative to sleeve 16 so that in Figure 1 splines 17 and 21 are not in contact whereas in Figure 2 splines 17 and 21 are engaged. Sleeve 20 may be of any external shape such as circular but preferably is provided with a roughened exterior 22 for easy engagement with the fingers so that torque may be applied to sleeve 20.

An ordinary padlock (not shown) is provided having a shackle 23 adapted to be placed between sleeve 20 and upper shoulder 12.

Operation

Starting with the device as shown in Figure 2, it is easy to screw threads 14 into screw threads 6 because torque applied to sleeve 20 is transmitted through splines 21 and 17 to sleeve 16. Sleeve 16 being nonrotatable relative to sleeve 15 and sleeve 15 having threads 14 thereon, it is easy to connect or disconnect threads 6 and 14. Spring 19 urges sleeve 20 into position but it should be noted at this point that spring 19, while preferred and convenient, is not essential as sleeve 20 may be lifted to engage splines 17 and 21. However, we prefer to use spring 19 and believe its use has advantages over its non-use.

Threads 14 and 6 having been connected it is now desired to lock them in connected position. An ordinary padlock (not shown) is placed with its shackle 23 around part 10 and between shoulder 12 and sleeve 20 as shown in Figure 1. Shackle 23 forces sleeve 20 down compression spring 19 (if present) and disengages splines 17 and 21. In the position shown in Figure 1 it is impossible to rotate screw threads 14 by means of sleeve 20 because sleeve 20 rotates freely on sleeve 16 and is not connected thereto so torque cannot be transmitted from sleeve 20 to threads 14.

As body 4 and pipe 7 are substantially immovable in most instances as they are connected to a house (not shown) the connections 6 and 14 cannot be broken. However, even if body 4 and pipe 7 are rotatable relative to each other, it is still substantially impossible to disconnect threads 6 and 14 because there is no means to transmit torque and rotation of pipe 7 relative to body 4 will only turn head 8 and reduced portion 10 and 11 inside of sleeve 15 because there is no torque transmitting connection between 11 and 15 nor is there any torque transmitting connection between 16 and 20.

Obviously changes may be made in proportion and design of parts without departing from the invention which is defined in the claims. For example in Figure 2, sleeve 20 could overhang sleeve 18 and extend very close to body 4 to obviate the insertion of any tool between 20 and 4 to grasp hold of 14. The proportions shown in the drawing are believed sufficient to obviate ordinary tampering by un-authorized persons. It is obvious, for example, that sleeves 15 and 16 could be made integral as one piece without change in design of the other parts. Numerous similar changes may be made without departing from the invention as claimed.

Having described our invention, we claim:

1. A lockable pipe connection for engagement with a screw threaded opening in a body comprising in combination a pipe having an end adapted to be disposed in communication with said opening, said pipe having an intermediate portion of reduced area betwen upper and lower shoulders, a screw threaded sleeve mounted for rotation on said portion of reduced area, said screw threaded sleeve being adapted to screw into said screw threaded opening, said screw threaded sleeve having a non-circular portion, an externally splined sleeve non-rotatably engaging said non-circular portion, an internally splined sleeve mounted on said externally splined sleeve to be movable longitudinally of its axis from a first position of splined connection with said externally splined sleeve to a second position of free rotation relative to said externally splined sleeve, spring means urging said internally splined sleeve into said first position, and a padlock having a shackle adapted to be disposed between said internally splined sleeve and the upper shoulder of said pipe and when so disposed to retain said internally splined sleeve in said second position, whereby when said shackle is so located said screw threaded sleeve cannot be rotated by said internally splined sleeve, but when said shackle is removed said internally splined sleeve and said screw threaded sleeve may be rotated together relative to said body.

2. A lockable pipe connection for engagement with a screw threaded opening in a body comprising in combination a pipe having an end adapted to be disposed in communication with said opening, said pipe having an intermediate portion of reduced area between upper and lower shoulders, a screw threaded sleeve mounted for rotation on said portion of reduced area, said screw threaded sleeve being adapted to screw into said screw threaded opening, said screw threaded sleeve having a non-circular portion, an externally splined sleeve non-rotatably engaging said non-circular portion, an internally splined sleeve mounted on said externally splined sleeve to be movable longitudinally of its axis from a first position of splined connection with said externally splined sleeve to a second position of free rotation relative to said externally splined sleeve, and a padlock having a shackle adapted to be disposed between said internally splined sleeve and the upper shoulder of said pipe and when so disposed to retain said internally splined sleeve in said second position, whereby when said shackle is so located said screw threaded sleeve cannot be rotated by said internally splined sleeve, but when said shackle is removed said internally splined sleeve and said screw threaded sleeve may be rotated together relative to said body.

3. A lockable pipe connection for engagement with a screw threaded opening in a body comprising in combination a pipe having an end adapted to be disposed in communication with said opening, said pipe having an intermediate portion of reduced area between upper and lower shoulders, a screw threaded sleeve mounted for rotation on said portion of reduced area, said screw threaded sleeve being adapted to screw into said screw threaded opening, said screw threaded sleeve being provided with an externally splined portion, an internally splined sleeve mounted for movement longitudinally of said screw threaded sleeve from a first position of splined connection with said externally splined portion to a second position of free rotation relative to said screw threaded sleeve, spring means urging said internally splined sleeve into said first position, and a padlock having a shackle adapted to be disposed between said internally splined sleeve and the upper shoulder of said pipe and when so disposed to retain said internally splined sleeve in said second position, whereby when said shackle is so located said screw threaded sleeve cannot be rotated by said internally splined sleeve, but when said shackle is removed said internally splined sleeve and said screw threaded sleeve may be rotated together relative to said body.

4. A lockable pipe connection for engagement with a screw threaded opening in a body comprising in combination a pipe having an end adapted to be disposed in communication with said opening, said pipe having an intermediate portion of reduced area between upper and lower shoulders, a screw threaded sleeve mounted for rotation on said portion of reduced area, said screw threaded sleeve being adapted to screw into said screw threaded opening, said screw threaded sleeve being provided with an externally splined portion, an internally splined sleeve mounted for movement longitudinally of said screw threaded sleeve from a first position of splined connection with said externally splined portion to a second position of free rotation relative to said screw threaded sleeve, and a padlock having a shackle adapted to be disposed between said internally splined sleeve and the upper shoulder of said pipe and when so disposed to retain said internally splined sleeve in said second position, whereby when said shackle is so located said screw threaded sleeve cannot be rotated by said internally splined sleeve, but when said shackle is removed said internally splined sleeve and said screw threaded sleeve may be rotated together relative to said body.

THEODORE A. ST. CLAIR.
WILLIAM R. EDDY.